United States Patent
Kobayashi

(10) Patent No.: US 10,461,441 B2
(45) Date of Patent: Oct. 29, 2019

(54) ALUMINUM ALLOY ELEMENT WIRE, ALUMINUM ALLOY STRANDED WIRE AND METHOD FOR PRODUCING ALUMINUM ALLOY STRANDED WIRE, AUTOMOTIVE ELECTRIC WIRE, AND WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Hiroyuki Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/565,599

(22) PCT Filed: Apr. 12, 2016

(86) PCT No.: PCT/JP2016/061818
§ 371 (c)(1),
(2) Date: Oct. 10, 2017

(87) PCT Pub. No.: WO2016/175025
PCT Pub. Date: Nov. 3, 2016

(65) Prior Publication Data
US 2018/0115088 A1    Apr. 26, 2018

(30) Foreign Application Priority Data

Apr. 28, 2015 (JP) ................. 2015-091945

(51) Int. Cl.
*H01R 4/18* (2006.01)
*C22C 21/00* (2006.01)
(Continued)

(52) U.S. Cl.
CPC ......... *H01R 4/185* (2013.01); *B60R 16/0207* (2013.01); *C22C 21/00* (2013.01);
(Continued)

(58) Field of Classification Search
CPC ..... B60R 16/0207; C22C 21/00; C22C 21/08; C22F 1/04; C22F 1/047; H01B 1/023; H01B 5/02; H01B 5/08
See application file for complete search history.

(56) References Cited

U.S. PATENT DOCUMENTS 3,843,418 A * 10/1974 Oida et al. ............... C22C 21/08
148/415
4,042,424 A * 8/1977 Nicoud ................. C22C 21/08
148/690
(Continued)

FOREIGN PATENT DOCUMENTS

CN    103298963 A    9/2013
JP    2001-135151 A    5/2001
(Continued)

OTHER PUBLICATIONS

Aug. 1, 2018 Office Action issued in Chinese Patent Application No. 201680021440.2.
(Continued)

*Primary Examiner* — Timothy J Thompson
*Assistant Examiner* — Rhadames Alonzo Miller
(74) *Attorney, Agent, or Firm* — Oliff PLC

(57) ABSTRACT

An aluminum alloy element wire has a chemical composition including in mass percent: Mg: 0.3% or more and 0.9% or less, Si: 0.1% or more and 0.7% or less, Fe: 0.1% or more
(Continued)

and 0.4% or less, at least one element selected from the group consisting of Cu, Cr, Ni, and Zr: 0.01% or more and 0.5% or less in total, and the balance being Al and unavoidable impurities. The aluminum alloy element wire has a surface roughness Ra in the range of 0.15 μm or more and 2 μm or less as measured with a non-contact surface roughness measuring machine. An aluminum alloy stranded wire includes a plurality of the aluminum alloy element wires twisted together. An automotive electric wire includes the aluminum alloy stranded wire. A wire harness includes the automotive electric wire, and a terminal crimped to the aluminum alloy stranded wire of the automotive electric wire.

20 Claims, 1 Drawing Sheet

(51) Int. Cl.
H01B 1/02 (2006.01)
H01B 5/02 (2006.01)
H01B 5/08 (2006.01)
H01B 7/00 (2006.01)
H01B 13/00 (2006.01)
B60R 16/02 (2006.01)
C22C 21/08 (2006.01)
H01B 13/012 (2006.01)
C22F 1/04 (2006.01)
C22F 1/047 (2006.01)

(52) U.S. Cl.
CPC ............... *C22C 21/08* (2013.01); *C22F 1/04* (2013.01); *C22F 1/047* (2013.01); *H01B 1/02* (2013.01); *H01B 1/023* (2013.01); *H01B 5/02* (2013.01); *H01B 5/08* (2013.01); *H01B 7/00* (2013.01); *H01B 13/00* (2013.01); *H01B 13/01209* (2013.01)

(56) References Cited

U.S. PATENT DOCUMENTS

| | | | | |
|---|---|---|---|---|
| 2003/0143102 | A1* | 7/2003 | Matsuoka | C22C 21/04 420/546 |
| 2006/0013719 | A1* | 1/2006 | Ichikawa | C22C 21/10 419/29 |
| 2007/0221396 | A1* | 9/2007 | Izumida | C21D 8/06 174/128.1 |
| 2008/0196923 | A1* | 8/2008 | Susai | C22C 21/00 174/110 R |
| 2009/0269970 | A1 | 10/2009 | Kumakura | |
| 2010/0059151 | A1* | 3/2010 | Iwamura | C22C 21/12 148/690 |
| 2010/0071933 | A1* | 3/2010 | Otsuka | C21D 9/60 174/128.1 |
| 2011/0132659 | A1* | 6/2011 | Kusakari | B21C 1/00 174/72 A |
| 2012/0118607 | A1* | 5/2012 | Ishibashi | C22C 21/00 174/126.1 |
| 2013/0264115 | A1* | 10/2013 | Kobayashi | H01B 1/023 174/72 A |
| 2014/0367001 | A1* | 12/2014 | Inagaki | B22D 21/04 148/552 |
| 2015/0007910 | A1 | 1/2015 | Sekiya et al. | |
| 2015/0213913 | A1 | 7/2015 | Yoshida et al. | |
| 2017/0098487 | A1 | 4/2017 | Kobayashi et al. | |

FOREIGN PATENT DOCUMENTS

| | | | |
|---|---|---|---|
| JP | 2004-134212 A | | 4/2004 |
| JP | 2009-266469 A | | 11/2009 |
| JP | 2010-036237 A | | 2/2010 |
| JP | 2010036237 A | * | 2/2010 |
| JP | 2010-265509 A | | 11/2010 |
| JP | 2014-116204 A | | 6/2014 |
| JP | 5607853 B1 | | 10/2014 |
| WO | 2012/141041 A1 | | 10/2012 |
| WO | 2013/147270 A1 | | 10/2013 |
| WO | 2014/155819 A1 | | 10/2014 |

OTHER PUBLICATIONS

Oct. 31, 2017 International Preliminary Report on Patentability issued in International Patent Application No. PCT/JP2016/061818.
Jul. 19, Search Report issued in International Patent Application No. PCT/JP2016/061818.
Jul. 2, 2019 Office Action issued in Chinese Patent Application No. 201680021440.2.
Jan. 29, 2019 Office Action issued in Chinese Patent Application No. 201680021440.2.

* cited by examiner

ALUMINUM ALLOY ELEMENT WIRE, ALUMINUM ALLOY STRANDED WIRE AND METHOD FOR PRODUCING ALUMINUM ALLOY STRANDED WIRE, AUTOMOTIVE ELECTRIC WIRE, AND WIRE HARNESS

This application is the US national stage of International Patent Application No. PCT/JP2016/061818 filed on Apr. 12, 2016, which claims priority to Japanese Patent Application No. 2015-091945 filed on Apr. 28, 2015.

TECHNICAL FIELD

The present invention relates to an aluminum alloy element wire, an aluminum alloy stranded wire and a method for producing the aluminum alloy stranded wire, an automotive electric wire, and a wire harness.

BACKGROUND ART

There has been conventionally known an aluminum alloy stranded wire that is made up of a plurality of aluminum alloy element wires twisted together. There has also been known an automotive electric wire including an aluminum alloy stranded wire. There has also been known a wire harness including an automotive electric wire, and a terminal crimped to an aluminum alloy stranded wire of the automotive electric wire.

Patent Document 1 as a related art discloses a technique for crimping a terminal to a folded portion formed by folding the tip of an aluminum core wire, in order to improve a terminal crimp strength.

PRIOR ART DOCUMENT

Patent Document

Patent Document 1: JP-A-2009-266469

SUMMARY OF THE INVENTION

Problem to be Solved by the Invention

However, the conventional art is impractical because it needs the folded portion to be formed, and the number of steps in a crimping process increases. Furthermore, in the case where a terminal is crimped to an aluminum alloy stranded wire without any folded portion being formed, an aluminum alloy element wire situated inside the aluminum alloy stranded wire is detached even if the contact electric resistance between the aluminum alloy stranded wire and the terminal is favorable, which is problematic in that a terminal crimp strength is reduced.

The present invention has been made in view of the above circumstances, and is aimed to provide an aluminum alloy element wire, an aluminum alloy stranded wire, an automotive electric wire and a wire harness which make it possible to improve a terminal crimp strength.

Means for Solving the Problem

One aspect of the present invention is an aluminum alloy element wire for use as a conductor of an automotive electric wire, having:
a chemical composition including in mass percent
Mg: 0.3% or more and 0.9% or less,
Si: 0.1% or more and 0.7% or less,
Fe: 0.1% or more and 0.4% or less,
at least one element selected from the group consisting of Cu, Cr, Ni, and Zr: 0.01% or more and 0.5% or less in total, and
the balance being Al and unavoidable impurities; and
a surface roughness Ra being in the range of 0.15 µm or more and 2 µm or less as measured with a non-contact surface roughness measuring machine.

Another aspect of the present invention is an aluminum alloy stranded wire including a plurality of the aluminum alloy element wires that are twisted together.

Still another aspect of the present invention is an automotive electric wire including the aluminum alloy stranded wire.

Still another aspect of the present invention is a wire harness including the automotive electric wire, and a terminal crimped to the aluminum alloy stranded wire of the automotive electric wire.

Still another aspect of the present invention is a method for producing an aluminum alloy stranded wire for use as a conductor of an automotive electric wire, including:
a casting step of forming a cast material having a chemical composition comprising in mass percent:
Mg: 0.3% or more and 0.9% or less;
Si: 0.1% or more and 0.7% or less;
Fe: 0.1% or more and 0.4% or less;
at least one element selected from the group consisting of Cu, Cr, Ni, and Zr: 0.01% or more and 0.5% or less in total; and
the balance being Al and unavoidable impurities;
an extending step of subjecting the cast material to plastic working to form a wrought product;
a wire drawing step of subjecting the wrought product to wire drawing to form a drawn wire; and
a wire stranding step of twisting a plurality of the drawn wires together to form a stranded wire material and subjecting the stranded wire material to heat treatment, or of subjecting the drawn wire to heat treatment and twisting a plurality of the drawn wires subjected to heat treatment together to form a stranded wire material; wherein
the wire drawing is performed to give the drawn wire a surface roughness Ra of 0.15 µm or more and 2 µm or less as measured with a non-contact surface roughness measuring machine, or
the drawn wire is subjected to roughing treatment after the wire drawing and before forming the stranded wire material to have a surface roughness Ra in the range of 0.15 µm or more and 2 µm or less as measured with a non-contact surface roughness measuring machine.

Effects of the Invention

The aluminum alloy element wire has the chemical composition as specified above, and the surface roughness Ra being within the specified range as measured with a non-contact surface roughness measuring machine. The aluminum alloy stranded wire includes a plurality of the aluminum alloy element wires that are twisted together. The automotive electric wire includes the aluminum alloy stranded wire. The wire harness includes the automotive electric wire, and a terminal crimped to the aluminum alloy stranded wire of the automotive electric wire.

Having such configurations, the aluminum alloy element wire, the aluminum alloy stranded wire, the automotive electric wire and the wire harness makes it possible to improve the terminal crimp strength. This improvement is achieved because the surface of the aluminum alloy element wire having the specified chemical composition has the specified range of the surface roughness Ra. That is, when the terminal is crimped to the aluminum alloy stranded wire, the friction force between the aluminum alloy element wires situated inside the aluminum alloy stranded wire increases, so that slipping between the aluminum alloy element wires is reduced. Consequently, the aluminum alloy element wires situated inside the aluminum alloy stranded wire are made hardly detached.

The method for producing an aluminum alloy stranded wire includes the abovementioned steps. According to this method, the aluminum alloy stranded wire that can provide improved terminal crimp strength can be obtained.

MODE FOR CARRYING OUT THE INVENTION

Figure 1:
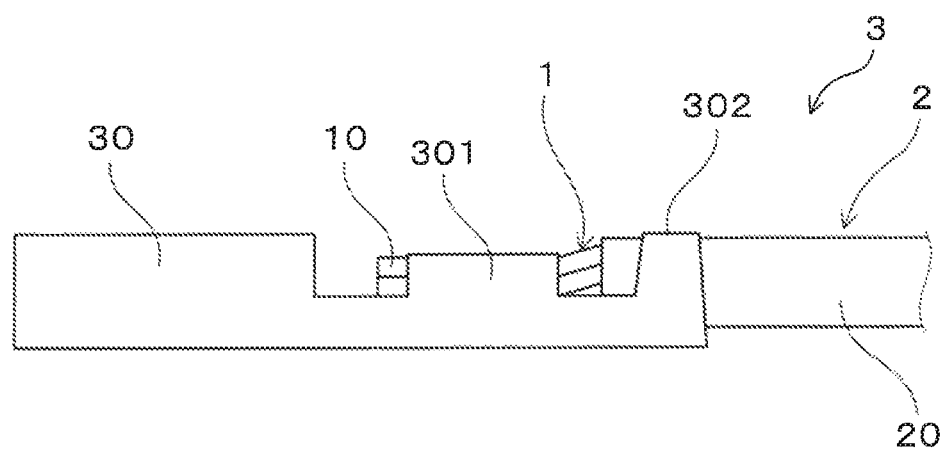
FIG. 1 is an illustration of an aluminum alloy element wire, an aluminum alloy stranded wire, an automotive electric wire and a wire harness according to Example 1.

The limitations on the chemical composition of the aluminum alloy element wire will be reasoned below.

Mg: 0.3% by mass or more and 0.9% by mass or less,
Si: 0.1% by mass or more and 0.7% by mass or less When Mg is contained in amount of 0.3% by mass or more and Si is contained in amount of 0.1% by mass or more, $Mg_2Si$ precipitates to surely provide the aluminum alloy element wire with a strength sufficiently when in use as a conductor of an automotive electric wire. If the Mg content is more than 0.9% by mass and/or the Si content is more than 0.7% by mass, the aluminum alloy element wire is increased in strength, but is deteriorated in conductivity and tends to be broken during wire drawing. Consequently, the Mg content is set to 0.9% by mass or less and the Si content is set to s0.7% by mass or less.

The Mg content can be preferably 0.35% by mass or more, more preferably 0.4% by mass or more, further preferably 0.45% by mass or more, still more preferably 0.5% by mass or more from the viewpoint of improving the strength of the aluminum alloy element wire. The Mg content can be preferably 0.85% by mass or less, more preferably 0.8% by mass or less, further preferably 0.75% by mass or less, still more preferably 0.7% by mass or less from the viewpoint of balancing between the strength and the conductivity in the aluminum alloy element wire.

The Si content can be preferably 0.15% by mass or more, more preferably 0.2% by mass or more, further preferably 0.25% by mass or more, still more preferably 0.3% by mass or more, further still more preferably 0.35% by mass or more from the viewpoint of improving the strength of the aluminum alloy element wire. The Si content can be preferably 0.68% by mass or less, more preferably 0.65% by mass or less, further preferably 0.6% by mass or less from the viewpoint of balancing between the strength and the conductivity in the aluminum alloy element wire.

Fe: 0.1% by mass or more and 0.4% by mass or less

As the Fe content is increased, the strength of the aluminum alloy element wire is increased. In order to exert the effect thus resulted from the Fe, the Fe content is set to 0.1% by mass or more. However, if the Fe content is excessively high, the aluminum alloy element wire is deteriorated in conductivity and toughness, and tends to be broken during wire drawing. Accordingly, the Fe content is 0.4% by mass or less.

The Fe content can be preferably 0.12% by mass or more, more preferably 0.15% by mass or more from the viewpoint of improving the strength of the aluminum alloy element wire. The Fe content can be preferably 0.38% by mass or less, more preferably 0.34% by mass or less, further preferably 0.3% by mass or less from the viewpoint of surely providing the aluminum alloy element wire with conductivity and toughness.

At least one element selected from the group consisting of Cu, Cr, Ni, and Zr: 0.01% by mass or more and 0.5% by mass or less in total These additive elements are effective for improvements of both the heat resistance and the strength in the aluminum alloy element wire. In order to exert the effect of the added additive elements, the total content of the additive elements is 0.01% by mass or more. However, if the total content of the additive elements is excessively high, the aluminum alloy element wire is deteriorated in conductivity and tends to be broken during wire drawing. Consequently, the total content of the additive elements is set to 0.5% by mass or less.

The total content of the additive elements can be preferably 0.02% by mass or more, more preferably 0.03% by mass or more, further preferably 0.04% by mass or more, still more preferably 0.05% by mass or more from the viewpoint of improving the heat resistance and the strength in the aluminum alloy element wire. The total content of the additive elements can be preferably 0.45% by mass or less, more preferably 0.4% by mass or less, further preferably 0.35% by mass or less.

The chemical composition can further include Ti and/or B. In this case, the Ti content can be 0.003% by mass or more and 0.03% by mass or less (30 ppm or more and 300 ppm or less by mass ratio), and the B content can be 0.0003% by mass or more and 0.003% by mass or less (3 ppm or more and 30 ppm or less by mass ratio).

Both of Ti and B can further improve the strength of the aluminum alloy element wire. Ti and B have an effect of refining the crystal structure of an aluminum alloy in casting. If the crystal structure is fine, not only the strength but also the wire drawability in the aluminum alloy element wire can be improved. The Ti content is set to 0.003% by mass or more and the B content is set to 0.0003% by mass or more from the viewpoint of sufficiently exerting the effect of refining the crystal structure. However, if the Ti content is more than 0.03% by mass and/or the B content is more than 0.003% by mass, the conductivity of the aluminum alloy element wire is deteriorated and also the effect of refining the crystal structure is saturated. Consequently, the Ti content is 0.03% by mass or less and the B content is 0.003% by mass or less.

The Ti content can be preferably 0.005% by mass or more, more preferably 0.007% by mass or more, further preferably 0.01% by mass or more from the viewpoint of promoting the refining of the crystal structure. The Ti content can be preferably 0.025% by mass or less, more preferably 0.02% by mass or less from the viewpoint of surely providing the aluminum alloy element wire with conductivity. The B content can be preferably 0.0005% by mass or more, more preferably 0.001% by mass or more, further preferably 0.002% by mass or more, still more preferably 0.003% by mass or more in view of the promotion of refining of the crystal structure from the viewpoint of promoting the refining of the crystal structure. The B content can be preferably 0.0025% by mass or less, more preferably 0.002% by mass or less from the viewpoint of surely providing the aluminum alloy element wire with conductivity.

The surface roughness Ra of the aluminum alloy element wire is in the range of 0.15 μm or more and 2 μm or less as measured with a non-contact surface roughness measuring machine. Herein, the non-contact surface roughness measuring machine is adopted from New View series manufactured by Zygo Corporation.

If the surface roughness Ra is less than 0.15 μm, slippage tends to occur between the aluminum alloy element wires situated inside the aluminum alloy stranded wire at the time of crimping a terminal to the aluminum alloy stranded wire, and thus the aluminum alloy element wires are easily detached. Therefore, the improvement in the terminal crimp strength is difficult. On the other hand, if the surface roughness Ra is more than 2 μm, the terminal crimp strength is difficult to enhance.

The surface roughness Ra can be preferably 0.16 μm or more, more preferably 0.17 μm or more, further preferably 0.18 μm or more, still more preferably 0.19 μm or more, further still more preferably 0.2 μm or more from the viewpoint of certainly exerting the effect of improving the terminal crimp strength. The surface roughness Ra can be preferably 1.8 μm or less, more preferably 1.7 μm or less, further preferably 1.5 μm or less, still more preferably 1.3 μm or less, further still more preferably 1 μm or less from the viewpoint of certainly exerting the effect of improving the terminal crimp strength.

The wire diameter of the aluminum alloy element wire can be 0.1 mm or more and 0.4 mm or less. Such configuration makes it possible to produce an aluminum alloy element wire that is hardly broken by foreign substances got mixed during production, and is excellent in flexibility against vibration. In addition, the aluminum alloy element wire is excellent also in wire drawability and wire twistability.

The wire diameter of the aluminum alloy element wire can be preferably 0.15 mm or more, more preferably 0.17 mm or more, further preferably 0.2 mm or more. Moreover, the wire diameter of the aluminum alloy element wire can be preferably 0.35 mm or less, more preferably 0.3 mm or less.

The aluminum alloy stranded wire includes a plurality of the aluminum alloy element wires that are twisted together. In the aluminum alloy stranded wire, the number of the aluminum alloy element wires to be twisted together can be, for example, 7, 11, 19, or 37. Such configuration make it possible to produce an aluminum alloy stranded wire suitable for use in an automotive engine is obtained. The number of the aluminum alloy element wires twisted together is preferably 11, 19, or 37, more preferably 19 or 37. As the number of the aluminum alloy element wires twisted together is larger, the number of the aluminum alloy element wires inside the aluminum alloy stranded wire is larger. Therefore, the abovementioned effect can be efficiently exerted. In particular, when the number of the aluminum alloy element wires twisted together is 19 or 37, the above effect is easily exerted.

In the aluminum alloy stranded wire, the twist pitch of the aluminum alloy element wires can be, for example, in the range from 10 to 50 mm. Such configuration is advantageous for enhancement of fatigue resistance and of productivity in a stranded wire. The twist pitch of the aluminum alloy element wires can be preferably 12 mm or more, more preferably 15 mm or more, further preferably 17 mm or more, still more preferably 20 mm or more. In addition, the twist pitch of the aluminum alloy element wires can be preferably 48 mm or less, more preferably 45 mm or less, further preferably 43 mm or less, still more preferably 40 mm or less.

The tensile strength of the aluminum alloy stranded wire is preferably in the range of 200 MPa or more and 350 MPa or less. Such configuration makes it possible to produce an aluminum alloy stranded wire having strength and elongation in a well-balanced manner. In addition, it is made easy to reliably provide the aluminum alloy stranded wire with fatigue resistance against vibration, and the resulting aluminum alloy stranded wire is suitable for use under a vibration environment such as in an automotive engine.

The tensile strength of the aluminum alloy stranded wire can be preferably 210 MPa or more, more preferably 220 MPa or more, further preferably 230 MPa or more from the viewpoint of improving the strength, or the like. In addition, the tensile strength of the aluminum alloy stranded wire can be preferably 330 MPa or less, more preferably 300 MPa or less, further preferably 290 MPa or less from the viewpoint of surely providing elongation, or the like.

The elongation of the aluminum alloy stranded wire is preferably 6% or more. Such configuration makes it possible to produce an aluminum alloy stranded wire that is advantageous for enhancement of toughness. The elongation of the aluminum alloy stranded wire can be preferably 7% or more, more preferably 8% or more, further preferably 9% or more, still more preferably 10% or more. In addition, the elongation of the aluminum alloy stranded wire can be preferably 15% or less, more preferably 14% or less, further preferably 13% or less from the viewpoint of the balance with strength, and the like.

The automotive electric wire includes the aluminum alloy stranded wire. The automotive electric wire, specifically, can be configured to include the aluminum alloy stranded wire, and an insulator that covers the outer circumference of the aluminum alloy stranded wire.

The insulator can be formed of a resin composition mainly containing a polymer such as various resins and rubber (including an elastomer) having electrical insulation. The resins and the rubber can be employed singly or in combination of two or more. Specific examples of the polymer can include a vinyl chloride base resin, a polyolefin base resin, a polysulfone resin, a fluororesin, and a fluororubber. The insulator may be formed of a single layer, or may be formed of two or more layers. The thickness of the insulator can be, for example, 0.1 mm or more and 0.4 mm or less. The insulator may contain one, or two or more various additives for ordinary use in cables. Specific examples of the additives can include a filler, a flame retardant, an anti-oxidizing agent, an anti-aging agent, a lubricant, a plasticizer, a copper inhibitor, and a pigment.

Specifically, the automotive electric wire can be suitably used in an engine, for example. This is because an automotive engine is vibrated under a high temperature environment and thus is demanded to have high terminal crimp strength.

The wire harness includes the automotive electric wire, and a terminal crimped to the aluminum alloy stranded wire of the automotive electric wire. In the wire harness, specifically, the terminal can be crimped to the aluminum alloy stranded wire that is exposed by stripping the end portion of the automotive electric wire. Specifically, the wire harness can be configured such that a cable bundle including a plurality of the automotive electric wires is covered with a protective material.

The method for producing the aluminum alloy stranded wire includes the casting step, the extending step, the wire drawing step, and the wire stranding step.

In the casting step, casting can be performed employing any one of the casting techniques including continuous casting using a movable mold or a frame-shaped stationary mold, and mold casting (hereinafter referred to as "billet casting" as appropriate) using a box-shaped stationary mold, and the like. In particular, continuous casting makes it possible to rapidly cool and solidify a molten metal, and thus is advantageous for producing a cast material of a fine crystal structure. In addition, the rapid solidification makes crystal deposits fine easily, thus producing a cast material having a crystal structure in which fine crystal deposits are uniformly dispersed. When such a cast material is used as a raw material, it is made easy to produce an aluminum alloy stranded wire including an aluminum alloy element wire of a fine crystal structure. Thus, in this case, micronization of the crystals makes it possible to improve the strength in the aluminum alloy stranded wire and to enhance wire drawability.

As for a plastic working in the extending step, for example, hot-rolling or cold-rolling, and hot-extrusion or cold-extrusion, can be adopted. The extending step is preferably performed by subjecting the cast material to hot rolling, to form a rolled material. When a cast billet is used as the cast material, it is preferable to perform heat treatment (homogenization treatment) after casting. It is preferable to perform the casting step and the extending step successionally. In this case, the plastic working such as hot rolling can be done by utilizing the heat stored in the cast material. Thus, in this case, energy efficiency is high, and productivity is also high as compared with a case where both steps are performed in a batch manner.

In the wire drawing step, wire drawing can be specifically performed by cold wire-drawing. The degree of the wire drawing can be changed by an intermediate softening treatment performed appropriately in conformity to an intended wire diameter. In addition, in the method for producing the aluminum alloy stranded wire, the wire drawing gives the drawn wire the surface roughness Ra set to be 0.15 μm or more and 2 μm or less as measured with a non-contact surface roughness measuring machine. In this case, specifically, the surface roughness Ra of the drawn wire can be optimized by adjusting the surface relative roughness of a die for use in the wire drawing.

In the method for producing the aluminum alloy stranded wire, the surface roughness Ra of the drawn wire after subjected to the wire drawing may be less than 0.15 μm. In this case, the drawn wire is subjected to roughing treatment after the wire drawing and before forming the stranded wire material so as to have a surface roughness Ra in the range of 0.15 μm or more and 2 μm or less. As the roughing treatment, specifically, for example, mechanical techniques, chemical techniques, electric techniques, or the like can be applied. These techniques can be adopted singly or in combination of two or more. As the mechanical roughing treatment, blast treatment, polishing treatment, and transferring by a roll or the like having a roughened surface can be exemplified. As the chemical roughing treatment, etching with an alkali solution such as a solution containing NaOH, and etching with an acidic solution containing sulfuric acid, chromic acid, hydrofluoric acid, or the like can be exemplified, and as the electric roughing treatment, electrolytic etching using an electrolytic solution such as brine can be exemplified.

In the wire stranding step, a predetermined number of the drawn wires may be twisted together so as to produce the aluminum alloy stranded wire including a predetermined number of the aluminum alloy element wires. The heat treatment in the wire stranding step can be specifically softening treatment and/or aging treatment. The heat treatment can be performed in, for example, an air atmosphere or a non-oxidizing atmosphere. As the non-oxidizing atmosphere, atmospheres of vacuum, an inert gas (nitrogen, argon, or the like), and a reducing gas (hydrogen-containing gas and carbon dioxide-containing gas) can be exemplified. In order to inhibit formation of an oxide film on the surface of the drawn wire in the stranded wire material, the heat treatment is preferably performed in a non-oxidizing atmosphere of low oxygen content. In the wire stranding step, the heat treatment is preferably performed to provide the stranded wire material with tensile strength in the range of 200 MPa or more and 350 MPa or less and with elongation in the range of 6% to 15% or less. This is because such configuration makes it possible to produce an aluminum alloy stranded wire having a tensile strength in the range of 200 MPa or more and 350 MPa or less and a stranded wire elongation in the range of 6% to 15% or less is easily obtained.

The heat treatment may be performed in a batch manner or in a continuous manner. Also, combination of such manners is possible. The continuous heat treatment is a treatment technique of continuously heating a wire material, which has the advantage of imparting excellent workability because continuous heating is possible, and has the advantage of easily reducing variations in characteristics in the longitudinal direction of a wire material because the wire material can be heated uniformly in the longitudinal direction.

Examples of the continuous heat treatment technique can include a direct energization system (continuous softening treatment by energization) in which an object to be heated is heated by resistive heating, an indirect energization system (continuous softening treatment by high-frequency induction heating) in which an object to be heated is heated by high-frequency electromagnetic induction, and a furnace system in which an object to be heated is introduced into a heating vessel (pipe softening furnace or the like) set to be a heating atmosphere and heated by heat conduction. In the continuous heat treatment technique, linear velocity, heat amount, and the like can be appropriately modulated so that the elongation of the stranded wire material falls within the above range.

The heat treatment conditions in the abovementioned batch-wise heat treatment can be set, for example, such as follows: heating temperature: 140° C. or higher and 250° C. or lower, retention time: 4 hours or more and 16 hours or less.

Here, the abovementioned configurations can be combined as needed, for example, for obtaining the abovementioned operational effects.

EXAMPLE

Example 1

Examples of the aluminum alloy element wire, the aluminum alloy stranded wire and the method for producing the aluminum alloy stranded wire, the automotive electric wire, and the wire harness will be described together with Comparative Examples.

<Aluminum Alloy Wire and Aluminum Alloy Stranded Wire>

A pure aluminum ingot as a base material was molten in a melting furnace. The pure aluminum ingot had a purity of 99.7% or more. Additive elements shown in Table 1 were fed into a melting furnace in the contents (% by mass) as shown in Table 1, to prepare a molten aluminum alloy. Here, the content(s) of the component(s), Ti, or Ti and B was (were) adjusted to be as shown in Table 1 by feeding a Ti particle or a $TiB_2$ wire to a molten aluminum alloy immediately before casting as described below. The molten aluminum alloy, the component(s) of which was (were) adjusted, was subjected to hydrogen gas removal treatment and foreign substances removal treatment.

A belt-wheel-type continuous casting and rolling machine was used to continuously perform casting and hot rolling of the molten aluminum alloy, thereby producing a wire rod of φ9.5 mm, having a chemical composition shown in Table 1.

Next, the resulting wire rod was subjected to cold wire drawing using a predetermined die, and also subjected to intermediate softening treatment as shown in Table 1, or not subjected to intermediate softening treatment, thereby forming a drawn wire having a wire diameter shown in Table 1.

The surface roughness Ra of the resulting drawn wire was measured using a non-contact surface roughness measuring machine ("New View 1100" manufactured by Zygo Corporation). Specifically, the measurement was performed in the following way. A flat surface roughness as equivalent to a circle, of the drawn wire, obtained by a laser microscope of the non-contact surface roughness measuring machine was converted to an equivalent to a flat surface, and thereafter the arithmetic average deviation from the peak (center line) of the equivalent to the circle was calculated. The number of measured samples was defined as n=3, and the measured area was 85×64 μm.

As a result, after wire drawing, the surface roughness Ra of each drawn wires referred to as Samples 1 to Sample 5 and Sample 6-5 was 0.15 μm or more and 2 μm or less.

On the other hand, any sample drawn wire, the surface roughness Ra of which was less than 0.15 μm after wire drawing, was separately subjected to roughing treatment. Specifically, Sample 6-1 was subjected to roughing treatment, in which the sample was immersed in an aqueous solution of 40% by mass NaOH for 30 seconds. Sample 6-2 was subjected to roughing treatment, in which the sample was immersed in an aqueous solution of 10% by mass NaOH for 30 seconds. Sample 6-3 was subjected to roughing treatment, in which the sample was immersed in an aqueous solution of 1% by mass NaOH for 30 seconds. Sample 6-4 was subjected to roughing treatment, in which electrolytic etching (0.2 A) was performed using 5% by mass brine for 30 seconds. Sample 6-101 was subjected to roughing treatment, in which the sample was immersed in an aqueous solution of 60% by mass NaOH for 60 seconds. Here, the drawn wires referred to as Sample 6-102, Sample 1-101 and Sample 1-102 were not subjected to roughing treatment, for comparison, although the surface roughness Ra of each sample was less than 0.15 μm after wire drawing.

Next, the resulting drawn wires (aluminum alloy element wires) of each sample were twisted together in the number shown in Table 1 as a number of wires to be twisted together, and at a twist pitch of 24 mm, thereby forming each stranded wire material. Thereafter, the stranded wire material was subjected to heat treatment at the predetermined temperature shown in Table 1. In this way, each aluminum alloy stranded wire was obtained. Also, the aluminum alloy stranded wire can be released from twisting to be aluminum alloy element wires.

<Automotive Electric Wire>

The outer circumference of a conductor formed of the resulting aluminum alloy stranded wire was covered with polyvinyl chloride (PVC) serving as an insulator by extrusion at a thickness shown in Table 1. Thus, each automotive electric wire was obtained.

<Wire Harness>

Figure 2:
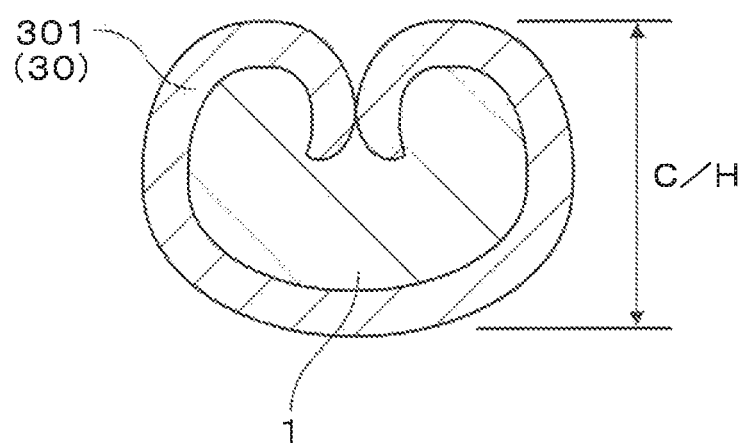
FIG. 2 is an illustration of the crimp height (C/H) in crimping a terminal according to Example 1.

As illustrated in FIG. 1, an insulator 20 was stripped at the end of an automotive electric wire 2 to expose a conductor (aluminum alloy stranded wire 1), and a terminal 30 was crimped to the conductor. The terminal 30 has a wire barrel 301 for fastening the aluminum alloy stranded wire 1 serving as a conductor of the automotive electric wire 2, and an insulation barrel 302 for fastening the insulator 20. In FIG. 1, a reference numeral 10 represents an aluminum alloy element wire. The terminal 30 is crimped by plastically deforming the respective barrels 301 and 302 using a mold having a predetermined shape, not illustrated. In the Example, as illustrated in FIG. 2, the terminal 30 was crimped in the condition where the crimp height (C/H) (compression rate) was set to 60% in each case. In FIG. 2, the aluminum alloy element wire is omitted. Each wire harness 3 was thus obtained.

(Tensile Strength and Elongation of Aluminum Alloy Stranded Wire)

The resulting aluminum alloy stranded wire as a conductor, thus obtained in the present example, was subjected to a tensile test in the conditions of a gauge length GL: 250 mm and a pulling rate: 50 mm/min, to measure the tensile strength (MPa) and the elongation (%) of the aluminum alloy stranded wire.

(Measurement of Terminal Crimp Strength)

The automotive electric wire of the wire harness was used to measure the terminal crimp strength. Specifically, the automotive electric wire to which the terminal was crimped was used, and the automotive electric wire was pulled at a pulling rate of 100 mm/min with the terminal being fixed, to measure the maximum load (N) at which the terminal was not detached, and the maximum load (N) was defined as the terminal crimp strength. Here, the samples were different in stranded wire diameter from each other. Therefore, the ratio of the terminal crimp strength to the load (N) at breakage of the conductor, measured in the tensile test, was calculated.

Table 1 shows the configurations of each aluminum alloy element wire, each aluminum alloy stranded wire, each automotive electric wire and each wire harness in detail. In addition, Table 2 shows the surface roughness Ra of each aluminum alloy element wire, and the tensile strength, the elongation, and the ratio of the terminal crimp strength/the load at breakage of the conductor of each aluminum alloy stranded wire.

[Table 1]

TABLE 1

| Sample No. | Chemical Composition (mass %) | | | | | | | | | | | Intermediate Softening | Element Wire Diameter (μm) | Surface Roughness Ra (μm) | Number of Wires to be twisted | Heat Treatment (° C.) | Insulator Thickness (mm) |
|---|---|---|---|---|---|---|---|---|---|---|---|---|---|---|---|---|---|
| | Al | Mg | Si | Fe | Cu | Cr | Ni | Zr | Ti | B | | | | | | | |
| 1 | Bal. | 0.88 | 0.64 | 0.3 | 0.18 | 0.14 | — | — | 0.03 | 0.006 | Not done | 0.185 | 0.30 | 19 | 170 | 0.28 |
| 2 | Bal. | 0.67 | 0.57 | 0.2 | — | — | 0.01 | — | 0.02 | 0.005 | Not done | 0.185 | 0.25 | 19 | 160 | 0.28 |
| 3 | Bal. | 0.65 | 0.53 | 0.15 | — | — | — | 0.05 | 0.01 | 0.004 | Done | 0.185 | 0.22 | 19 | 160 | 0.28 |
| 4 | Bal. | 0.65 | 0.53 | 0.15 | — | — | — | 0.05 | 0.01 | 0.004 | Done | 0.285 | 0.22 | 37 | 160 | 0.35 |
| 5 | Bal. | 0.62 | 0.50 | 0.2 | — | — | — | 0.05 | 0.01 | 0.004 | Done | 0.26 | 0.20 | 37 | 155 | 0.35 |
| 6-1 | Bal. | 0.52 | 0.45 | 0.18 | — | — | — | 0.03 | 0.01 | 0.004 | Done | 0.285 | 0.66 | 37 | 140 | 0.30 |
| 6-2 | Bal. | 0.52 | 0.45 | 0.18 | — | — | — | 0.03 | 0.01 | 0.004 | Done | 0.285 | 0.61 | 37 | 140 | 0.30 |
| 6-3 | Bal. | 0.52 | 0.45 | 0.18 | — | — | — | 0.03 | 0.01 | 0.004 | Done | 0.285 | 0.51 | 37 | 140 | 0.30 |
| 6-4 | Bal. | 0.52 | 0.45 | 0.18 | — | — | — | 0.03 | 0.01 | 0.004 | Done | 0.285 | 0.45 | 37 | 140 | 0.30 |
| 6-5 | Bal. | 0.52 | 0.45 | 0.18 | — | — | — | 0.03 | 0.01 | 0.004 | Done | 0.285 | 1.25 | 37 | 140 | 0.30 |
| 6-101 | Bal. | 0.52 | 0.45 | 0.18 | — | — | — | 0.03 | 0.01 | 0.004 | Done | 0.285 | 2.20 | 37 | 140 | 0.30 |
| 6-102 | Bal. | 0.52 | 0.45 | 0.18 | — | — | — | 0.03 | 0.01 | 0.004 | Done | 0.285 | 0.13 | 37 | 140 | 0.30 |
| 1-101 | Bal. | — | 0.04 | 1.15 | — | — | — | — | 0.003 | — | Done | 0.32 | 0.10 | 37 | 350 | 0.40 |
| 1-102 | Bal. | 0.15 | 0.04 | 1.05 | — | — | — | — | 0.02 | 0.005 | Done | 0.32 | 0.13 | 37 | 350 | 0.40 |

TABLE 2

| Sample No. | Surface Roughness Ra of Aluminum Alloy Element Wire (μm) | Tensile Strength of Aluminum Alloy Stranded Wire (MPa) | Elongation of Aluminum Alloy Stranded Wire (%) | Ratio of Terminal Crimp Strength/ Load at Breakage of Conductor |
|---|---|---|---|---|
| 1 | 0.30 | 220 | 8 | 0.68 |
| 2 | 0.25 | 280 | 9 | 0.65 |
| 3 | 0.22 | 260 | 9 | 0.63 |
| 4 | 0.22 | 260 | 9 | 0.63 |
| 5 | 0.20 | 255 | 10 | 0.60 |
| 6-1 | 0.66 | 250 | 12 | 0.72 |
| 6-2 | 0.61 | 250 | 12 | 0.71 |
| 6-3 | 0.51 | 250 | 12 | 0.70 |
| 6-4 | 0.45 | 250 | 12 | 0.69 |
| 6-5 | 1.25 | 250 | 12 | 0.75 |
| 6-101 | 2.20 | 250 | 12 | 0.57 |
| 6-102 | 0.13 | 250 | 12 | 0.58 |
| 1-101 | 0.10 | 120 | 20 | 0.55 |
| 1-102 | 0.13 | 140 | 15 | 0.58 |

As shown in Table 1 and Table 2, in each of Samples 1 to Sample 6-5, the aluminum alloy element wire has the specified chemical composition, and the surface roughness Ra of the aluminum alloy element wire falls within the specified range. Therefore, the terminal crimp strength in Samples 1 to Sample 6-5 was improved. This improvement was achieved because the surface of the aluminum alloy element wire having the specified chemical composition had the specified range of the surface roughness Ra. That is, when the terminal was crimped to the aluminum alloy stranded wire, the friction force between the aluminum alloy element wires situated inside the aluminum alloy stranded wire increased, so that slipping between the aluminum alloy element wires was reduced. Consequently, the aluminum alloy element wires situated inside the aluminum alloy stranded wire were made hardly detached.

On the contrary, in each of Sample 1-101 and Sample 1-102, the aluminum alloy element wire did not have the specified chemical composition, and the surface roughness Ra of the aluminum alloy element wire did not also fall within the specified range. Therefore, the terminal crimp strength in Sample 1-101 and Sample 1-102 was not improved.

In Sample 6-101, although the aluminum alloy element wire had the specified chemical composition, the surface roughness Ra of the aluminum alloy element wire was more than 2 Therefore, the terminal crimp strength in Sample 6-101 was not be enhanced.

In Sample 6-102, although the aluminum alloy element wire had the specified chemical composition, the surface roughness Ra of the aluminum alloy element wire was less than 0.15 Therefore, the terminal crimp strength in Sample 6-102 was not be enhanced.

While Example of the present invention is described above in detail, the present invention is not intended to be limited to the Example, and can be variously modified as long as the gist of the present invention is not impaired.

The invention claimed is:

1. An aluminum alloy element wire for use as a conductor of an automotive cable, having:
   a chemical composition comprising in mass percent
   Mg: 0.3% or more and 0.9% or less,
   Si: 0.1% or more and 0.7% or less,
   Fe: 0.1% or more and 0.4% or less,
   at least one element selected from the group consisting of Cu, Cr, Ni, and Zr: 0.01% or more and 0.5% or less in total, and the balance being Al and unavoidable impurities; and
a surface roughness Ra being in the range of 0.15 μm or more and 2 μm or less as measured with a non-contact surface roughness measuring machine.

2. The aluminum alloy wire according to claim 1, wherein the chemical composition further comprises in mass percent, Ti, a content of which is 0.003% or more and 0.03% or less and/or B, a content of which is 0.0003% or more and 0.003% or less.

3. The aluminum alloy element wire according to claim 1, wherein a wire diameter of the aluminum alloy element wire is 0.1 mm or more and 0.4 mm or less.

4. The aluminum alloy element wire according to claim 2, wherein a wire diameter of the aluminum alloy element wire is 0.1 mm or more and 0.4 mm or less.

5. An aluminum alloy stranded wire comprising a plurality of the aluminum alloy element wires according to claim 1, which are twisted together.

6. An aluminum alloy stranded wire comprising a plurality of the aluminum alloy element wires according to claim 2, which are twisted together.

7. An aluminum alloy stranded wire comprising a plurality of the aluminum alloy element wires according to claim 3, which are twisted together.

8. An aluminum alloy stranded wire comprising a plurality of the aluminum alloy element wires according to claim 4, which are twisted together.

9. The aluminum alloy stranded wire according to claim 5, wherein a tensile strength of the aluminum alloy stranded wire is 200 MPa or more and 350 MPa or less.

10. The aluminum alloy stranded wire according to claim 6, wherein a tensile strength of the aluminum alloy stranded wire is 200 MPa or more and 350 MPa or less.

11. The aluminum alloy stranded wire according to claim 7, wherein a tensile strength of the aluminum alloy stranded wire is 200 MPa or more and 350 MPa or less.

12. The aluminum alloy stranded wire according to claim 8, wherein a tensile strength of the aluminum alloy stranded wire is 200 MPa or more and 350 MPa or less.

13. The aluminum alloy stranded wire according to claim 5, wherein a number of the aluminum alloy element wires to be twisted together is one selected from numbers consisting of 7, 11, 19 and 37.

14. The aluminum alloy stranded wire according to claim 6, wherein a number of the aluminum alloy element wires to be twisted together is one selected from numbers consisting of 7, 11, 19 and 37.

15. The aluminum alloy stranded wire according to claim 7, wherein a number of the aluminum alloy element wires to be twisted together is one selected from numbers consisting of 7, 11, 19 and 37.

16. The aluminum alloy stranded wire according to claim 8, wherein a number of the aluminum alloy element wires to be twisted together is one selected from numbers consisting of 7, 11, 19 and 37.

17. The aluminum alloy stranded wire according to claim 12, wherein a number of the aluminum alloy element wires to be twisted together is one selected from numbers consisting of 7, 11, 19 and 37.

18. An automotive cable comprising the aluminum alloy stranded wire according to claim 5.

19. A wire harness comprising the automotive cable according to claim 18, and a terminal crimped to the aluminum alloy stranded wire of the automotive cable.

20. A method for producing an aluminum alloy stranded wire for use as a conductor of an automotive electric wire, comprising:
a casting step of forming a cast material having a chemical composition comprising in mass percent:
Mg: 0.3% or more and 0.9% or less;
Si: 0.1% or more and 0.7% or less;
Fe: 0.1% or more and 0.4% or less;
at least one element selected from the group consisting of Cu, Cr, Ni, and Zr: 0.01% or more and 0.5% or less in total; and
the balance being Al and unavoidable impurities;
an extending step of subjecting the cast material to plastic working to form a wrought product;
a wire drawing step of subjecting the wrought product to wire drawing to form a drawn wire; and
a wire stranding step of twisting a plurality of the drawn wires together to form a stranded wire material and subjecting the stranded wire material to heat treatment, or of subjecting the drawn wire to heat treatment and twisting a plurality of the drawn wires subjected to heat treatment together to form a stranded wire material; wherein
the wire drawing is performed to give the drawn wire a surface roughness Ra in the range of 0.15 μm or more and 2 μm or less as measured with a non-contact surface roughness measuring machine, or
the drawn wire is subjected to roughing treatment after the wire drawing and before forming the stranded wire material to have a surface roughness Ra in the range of 0.15 μm or more and 2 μm or less as measured with a non-contact surface roughness measuring machine.

* * * * *